(12) United States Patent
Do Rosario et al.

(10) Patent No.: US 12,311,638 B2
(45) Date of Patent: May 27, 2025

(54) LAMINATED PANE WITH LIGHT SOURCE

(71) Applicant: SAINT-GOBAIN GLASS FRANCE, Courbevoie (FR)

(72) Inventors: Jefferson Do Rosario, Herzogenrath (DE); Achim Zeichner, Herzogenrath (DE); Matthias Mandelartz, Herzogenrath (DE); Pierre Sarkissian, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/707,431

(22) PCT Filed: Jan. 19, 2023

(86) PCT No.: PCT/EP2023/051256
§ 371 (c)(1),
(2) Date: May 3, 2024

(87) PCT Pub. No.: WO2023/144007
PCT Pub. Date: Aug. 3, 2023

(65) Prior Publication Data
US 2025/0050624 A1    Feb. 13, 2025

(30) Foreign Application Priority Data
Jan. 31, 2022 (EP) .................................. 22154153

(51) Int. Cl.
*B32B 17/10* (2006.01)
*G02F 1/1335* (2006.01)

(52) U.S. Cl.
CPC .. *B32B 17/10541* (2013.01); *B32B 17/10036* (2013.01); *B32B 17/10504* (2013.01);
(Continued)

(58) Field of Classification Search
CPC ........ B32B 17/10541; B32B 17/10036; B32B 17/10504; B32B 17/10651; B32B 17/10935; B32B 2605/00; G02F 1/133512
See application file for complete search history.

(56) References Cited

U.S. PATENT DOCUMENTS 10,139,080 B2 * 11/2018 Masaki .................. B60Q 3/745
2012/0104789 A1    5/2012 Plavetich et al.
(Continued)

FOREIGN PATENT DOCUMENTS

CN    102785555 A    11/2012
CN    105291788 A    2/2016
(Continued)

OTHER PUBLICATIONS

English Machine Translation of WO 2007077099, Paulus et al (Year: 2025).*
(Continued)

*Primary Examiner* — Donald L Raleigh
(74) *Attorney, Agent, or Firm* — Pillsbury Winthrop Shaw Pittman LLP

(57) ABSTRACT

A laminated pane with light source, includes an outer pane and an inner pane, a first thermoplastic film arranged between the outer pane and the inner pane, a functional element with electrically controllable optical properties, a darkened layer, a decoupling element for decoupling light from the inner pane, and a light source arranged on a side edge of the inner pane or in a recess of the inner pane for coupling light into the inner pane, wherein the darkened layer has at least one opaque region having a light transmittance of less than or equal to 50% and the opaque region is present at least within the region between the light source and the functional element.

21 Claims, 5 Drawing Sheets

Figure 1:
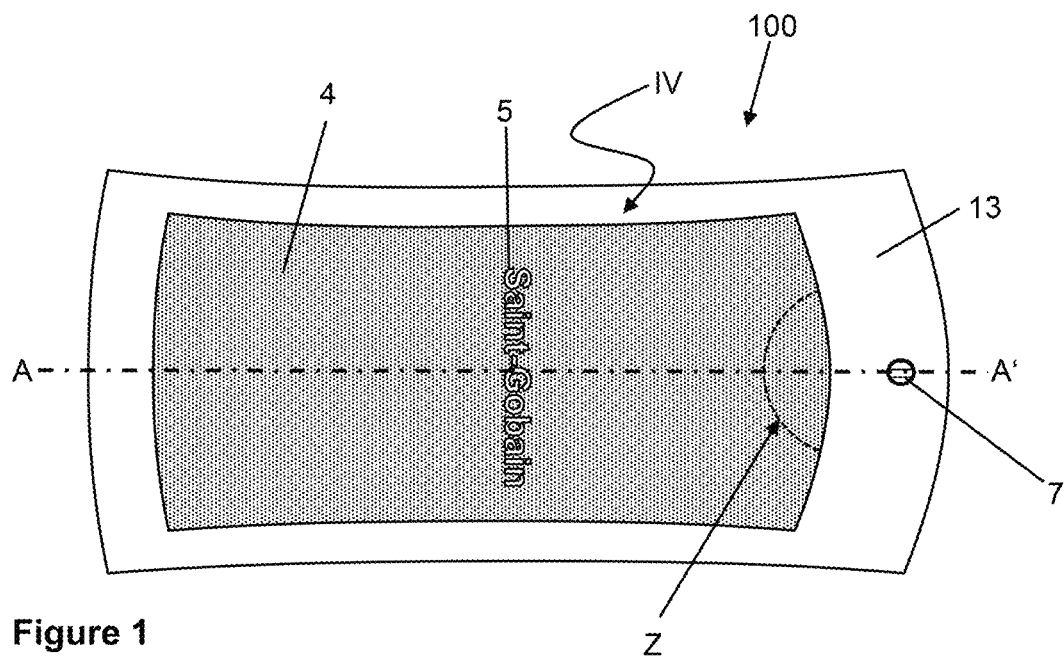

(52) U.S. Cl.
CPC .. *B32B 17/10651* (2013.01); *B32B 17/10935* (2013.01); *G02F 1/133512* (2013.01); *B32B 2605/00* (2013.01)

(56) References Cited

U.S. PATENT DOCUMENTS

| | | | |
|---|---|---|---|
| 2019/0106055 A1 | 4/2019 | Yoon | |
| 2019/0255812 A1 | 8/2019 | Bard et al. | |
| 2021/0394488 A1* | 12/2021 | Sadakane | B32B 17/10504 |

FOREIGN PATENT DOCUMENTS

| | | |
|---|---|---|
| CN | 109606251 A | 4/2019 |
| DE | 10 2005 007427 A1 | 8/2006 |
| DE | 10 2005 049081 B3 | 6/2007 |
| DE | 10 2007 027296 A1 | 12/2008 |
| DE | 10 2008 026339 A1 | 12/2009 |
| DE | 10 2013 001334 A1 | 7/2014 |
| DE | 20 2020 005499 U1 | 6/2021 |
| EP | 0 876 608 B1 | 4/2002 |
| EP | 2 917 159 A1 | 9/2015 |
| EP | 3 702 572 A1 | 9/2020 |
| WO | WO-2007077099 A1 * | 7/2007 ............ B32B 17/10 |
| WO | WO 2010/049638 A1 | 5/2010 |
| WO | WO 2011/033313 A1 | 3/2011 |
| WO | WO 2014/072138 A1 | 5/2014 |
| WO | WO 2018/149568 A1 | 8/2018 |
| WO | WO 2018/206236 A1 | 11/2018 |
| WO | WO 2019/120850 A1 | 6/2019 |
| WO | WO 2021/254976 A1 | 12/2021 |

OTHER PUBLICATIONS

International Search Report as issued in International Patent Application No. PCT/EP2023/051256, dated Mar. 13, 2023.

* cited by examiner

LAMINATED PANE WITH LIGHT SOURCE

CROSS-REFERENCE TO RELATED APPLICATIONS

This application is the U.S. National Stage of PCT/EP2023/051256, filed Jan. 19, 2023, which in turn claims priority to European patent application number 22154153.5 filed Jan. 31, 2022. The content of these applications are incorporated herein by reference in their entirety.

The invention relates to a laminated pane with light source, a method for the production thereof, and the use thereof.

Laminated panes with electrically controllable optical properties are known as such. They comprise laminated panes equipped with functional elements whose optical properties can be changed by an applied voltage. The functional elements are flat structures with electrically controllable optical properties of an active layer. This means that the optical properties of the active layer and in particular its transparency, scattering behavior or luminosity can be controlled by an electrical voltage. Examples of electro-optical functional elements are SPD (suspended particle device) functional elements, known, for example, from EP0876608B1 and WO2011033313A1 and PDLC (PDLC=polymer dispersed liquid crystal) functional elements, known, for example, from DE102008026339A1. Apart from this, there are also electrochromic functional elements which are known, for example, from EP3702572A1 or EP2917159A1.

Optically controllable functional elements, such as SPD, PDLC or electrochromic functional elements, are commercially available as multilayer film, wherein the active layer is arranged between two surface electrodes that are used to apply a voltage for controlling the active layer. As a rule, the two surface electrodes are arranged between two carrier films, typically made of PET. Commercially obtainable multilayer films are also covered on both sides with a protective film made of polypropylene or polyethylene which serve to protect the carrier films against contamination or scratching. In particular during the production of a laminated pane, the electro-optical functional element is cut out of the multilayer film in the desired size and shape and is inserted between the films of an intermediate layer by means of which two glass panes are laminated with one another to form the laminated pane. A typical application is constituted by windshields having electrically adjustable sun visors, which are known, for example, from DE102013001334A1, DE102005049081B3, DE102005007427A1, DE202020005499U1 and DE102007027296A1.

Apart from optically controllable functional elements, a laminated pane can also comprise further elements which have optically controllable properties. For example, lighting effects can be generated in a laminated pane by means of a light source, a light guide and a decoupling element. The light of the light source is thereby coupled into the light guide, wherein it remains in the light guide using the effect of the total reflection until it strikes the decoupling element. The light is emitted from the light guide at the decoupling element, whereby a locally limited lighting can be generated. The light guide and the decoupling element can be laminated into the laminated pane. However, it can also be that the light guide represents, for example, the inner pane of the laminated pane and the decoupling element is produced, for example, by locally limited roughening of a surface of the inner pane. The light source is usually an LED module which is positioned at the edge or in a hole of the light guide in order to be able to optimally couple the light into the light guide. Such embodiments are already disclosed in several documents (for example WO200777099A1, WO2010049638A1, US20120104789A1 and WO2018149568A1).

U.S. Ser. No. 10/139,080B2 discloses a roof pane with inner pane, outer pane, thermoplastic intermediate layer, and an SPD element. Light-emitting diodes are laminated between the outer pane and the inner pane as well as within the thermoplastic intermediate layer and can be switched on and off via electrical contacting. The SPD element is arranged here in the roof pane closer than the light-emitting diodes to the external surroundings. As a result, the SPD element in a darkened state blocks the exit of light from the diodes into the external environment. No light coupling is shown; the light-emitting diodes emit light through the inner pane into the vehicle interior. Accordingly, also no decoupling element for decoupling light is shown.

The patent application US2019255812A1 discloses a laminated pane with a laminated PDLC element. No light source is disclosed for coupling in light, and no decoupling element is disclosed for decoupling light.

Both technologies can be combined with one another. This is particularly suitable for roof panes in vehicles. The vehicle occupants can switch, for example, by switching the functional element between visibility through the roof pane and blocked view, for example by light scattering (if it is a PDLC functional element). On the other hand, lighting effects can be generated on the roof pane by means of light coupling and decoupling. These can supply aesthetic added value to improve the wellbeing of the occupants, or else to emit light when it is dark outside. Publications that teach the combination of functional elements with light coupling and targeted, regionally limited light decoupling are, for example, CN102785555A, CN105291788A, US2019106055A1 and CN109606251A.

However, it has been recognized that unaesthetic lighting effects can occur in the region of the functional element when the light source is arranged in spatial proximity to the functional element. Because the light of the light source cannot be 100% coupled into the light guide, light can strike the functional element and be reflected. This reflection is perceived by the observer as a type of glimmer on the pane and is of various intensities depending on the functional element used.

In contrast, the object of the present invention is to provide an improved laminated pane with a light source and a functional element with electrically controllable optical properties, wherein preferably interfering and undesired glimmer effects which arise in interaction with coupled visible light by the functional element are to be reduced or completely avoided.

The object of the present invention is achieved according to the invention by a laminated pane according to claim 1. Advantageous embodiments of the invention emerge from the dependent claims.

The laminated pane according to the invention with a light source comprises at least one outer pane and an inner pane, a first thermoplastic film, a functional element, a darkened layer, and a decoupling element. The first thermoplastic film is arranged between the outer pane and the inner pane. The functional element and the darkened layer are preferably arranged between the outer pane and the inner pane. The functional element has electrically controllable optical properties. The functional element is preferably arranged in a see-through region of the laminated pane. The decoupling element is provided for decoupling light from the inner pane. The light source is arranged on a side edge of the inner pane or in a recess of the inner pane. The light source is provided for coupling light into the inner pane. The decoupling element is provided to decouple the light from the light source that is coupled into the inner pane from the inner pane. The darkened layer has at least one opaque region with a light transmittance of less than or equal to 50%. The opaque region of the darkened layer is present at least in the region between the light source and the functional element. This means that the opaque region of the darkened layer extends at least over the entire region located between the light source and the functional element.

The inner pane has an outer-side surface facing the first thermoplastic film and an interior-side surface facing away from the first thermoplastic film. Preferably, the decoupling element decouples the light coupled in from the light source predominantly over the interior-side surface of the inner pane.

The light of the light source cannot be 100% coupled into the inner pane via total reflection. A portion of the light is transmitted through the interior-side surface of the inner pane and the outer-side surface of the inner pane. This portion of the light is reflected at the outer pane and strikes the functional element at least in regions. If light emitted by the light source strikes the functional element, this leads to an optically visible glimmer which increases in intensity the closer the affected region of the functional element is to the light source. The opaque region largely prevents the light emitted by the light source from striking the functional element. The opaque region absorbs the light that has exited through the outer-side surface of the inner pane, as a result of which the formation of an optically visible glimmer can be largely avoided.

The outer pane has an outer-side surface facing away from the first thermoplastic film, which is also at the same time the outer area of the laminated pane. The outer pane also has an interior-side surface facing the first thermoplastic film. The interior-side surface of the inner pane is at the same time the inner surface of the laminated pane. The laminated pane is provided for separating an external environment from an interior, preferably a vehicle interior. The outer surface of the outer pane is provided here to face the external environment and the interior-side surface of the inner pane is provided to face the interior.

The laminated pane has a peripheral side edge, which preferably comprises an upper edge and a lower edge and two edges running between them with a left and a right edge. Upper edge means the edge intended to point upward in the installed position. Lower edge means the edge intended to point downward in the installed position. The upper edge is often also referred to as the roof edge, and the lower edge is often also referred to as the engine edge.

In a preferred embodiment of the invention, the darkened layer is arranged between the functional element and the inner pane, and the first thermoplastic film is arranged between the functional element and the outer pane. In viewing through the laminated pane, the opaque region of the darkened layer coincides at least with an edge region of the functional element, which is closest to the light source. The opaque region thus extends over the entire region located between the light source and the functional element and an edge region of the functional element. Because the darkened layer is arranged between the functional element and the inner pane, light is effectively prevented from striking the surface of the functional element facing the inner pane. The glimmer is particularly intensive in the edge region of the functional element, which is closest to the light source. The intensity of the glimmer is reduced by the extension of the opaque region to the edge region of the functional element, which is closest to the light source. This is a great advantage of the invention. The edge region of the functional element, which is closest to the light source and coincides with the opaque region when viewing through the laminated pane, is preferably designed in the shape of a strip. The width of this edge region is preferably at least 1 cm, particularly preferably at least 3 cm, and in particular at least 5 cm. "Width" within the meaning of the invention means the extent perpendicular to the extension direction.

Preferably, the laminated pane comprises a second transparent thermoplastic film which particularly preferably has the same thickness as the functional element or a thickness deviating by up to 10% of the thickness of the functional element. The second thermoplastic film is arranged at least partially in a frame-like manner around the functional element. Particularly preferably, the second thermoplastic film is designed like a frame with a recess into which the functional element is inserted. The expression "partially in a frame-like manner around the functional element" can mean, for example, that the functional element terminates flush with a portion of the peripheral side edge of the laminated pane, so that the second thermoplastic film surrounds the functional element only outside of this portion. Due to the second thermoplastic film, which is arranged at least partially around the functional element, thickness differences of the laminated pane can be avoided, which in turn increases the stability of the laminated pane.

In a further preferred embodiment of the invention, at least the opaque region of the darkened layer has a light transmittance of less than 10% and preferably of less than 1%. In this embodiment, the darkened layer is particularly preferably designed as a thermoplastic film with the opaque region and a transparent region. The transparent region of the darkened layer has a light transmittance of 50% or higher. The darkened layer preferably extends over the entire surface of the laminated pane and forms a thermoplastic intermediate layer together with the first thermoplastic film and in some cases with the second thermoplastic film in the laminated pane. The functional element is embedded within the thermoplastic intermediate layer, wherein the first thermoplastic film is preferably arranged between the outer pane and the functional element, and the darkened layer is preferably arranged between the functional element and the inner pane. In this embodiment, the darkened layer preferably consists of the same material as the first thermoplastic film, wherein the opaque region of the darkened layer is achieved by coloring or tinting in regions. This embodiment is particularly advantageous because the darkened layer is also used for, in addition to achieving the technical object, bonding the outer pane, the functional element, and the inner pane, whereby material costs and method steps can be reduced.

Alternatively, the entire darkened layer has a light transmittance of less than 10% and preferably of less than 1%. In this case, the darkened layer preferably extends over not more than 40%, preferably over not more than 30%, and particularly preferably over not more than 20% of the area of the laminated pane. A transparent third thermoplastic film is arranged in the surface plane of the laminated pane offset from the darkened layer, so that the transparent thermoplastic film and the darkened layer when considered together extend over the entire surface of the laminated pane. The darkened layer thus extends over a region of the laminated pane which does not represent more than 40% of the area of the laminated pane; the third thermoplastic film extends over the remaining surface of the laminated pane. In a laminated state of the laminated pane, the first thermoplastic film, in some cases the second thermoplastic film, the third thermoplastic film and the darkened layer result in a thermoplastic intermediate layer. The functional element is embedded within the thermoplastic intermediate layer, wherein the first thermoplastic film is preferably arranged between the outer pane and the functional element, and the darkened layer and the third thermoplastic film are preferably arranged between the functional element and the inner pane. In this embodiment, the darkened layer preferably consists of the same material as the first thermoplastic film and the third thermoplastic film, wherein the low light transmittance of the darkened layer is achieved by coloring or tinting. This embodiment is particularly advantageous because the darkened layer is also used for, in addition to achieving the technical object, bonding the outer pane, the functional element, and the inner pane, whereby material costs and method steps can be reduced.

Within the meaning of the present invention, something is "transparent" if the light transmittance is more than 70%, in particular more than 75%. Within the meaning of the invention, "opaque" means a light transmittance of less than 50%, particularly preferably less than 10%, and in particular less than 1%. The light transmittance can be determined in accordance with ISO 9050 (2003-08) for building glazings.

In a further embodiment of the invention, the darkened layer is applied to the outer-side surface of the inner pane. In this embodiment, the darkened layer is preferably designed as a, particularly preferably black, screen printing. The darkened layer here is made, for example, of an enamel containing glass frits and a pigment, in particular black pigment. The enamel is typically applied in a screen printing method and is then burned in. This has the advantage that no additional film or layer is required in order to reduce the glimmer effect. Material costs can thereby be saved.

The laminated pane can be equipped with an opaque black printing, in particular in a peripheral edge region, as is common practice in the vehicle sector, in particular for windshields, rear windows and roof panes. The black printing is typically made of an enamel containing glass frits and a pigment, in particular black pigment. The printing ink is typically applied in a screen printing method and is then burned in. Such a black printing is applied to at least one of the pane surfaces, preferably the interior-side surface of the outer pane and/or inner pane. The cover printing preferably surrounds a central see-through region in a frame-like manner and serves in particular to protect the adhesive, by which the laminated pane for example can be connected, for example, to the vehicle body, from UV radiation. The opaque black printing preferably has a thickness of at least 10 μm and a maximum of 25 μm. With such thicknesses, the black printing is opaque without impairing the stability of the pane.

In a particularly preferred embodiment, the darkened layer is a tinted or colored thermoplastic film and has a light transmittance of at least 15% and at most 50%. The darkened layer preferably extends over the entire surface of the laminated pane. In this embodiment, the darkened layer is preferably arranged between the functional element and the inner pane. The extension of the darkened layer over the entire laminated pane effectively reduces the glimmer effect. It thus does not play any role where precisely the light is transmitted beyond the outer-side surface of the inner pane. The darkened layer has a high absorption for light over the entire area of the laminated pane.

The first thermoplastic film, the in some cases present second thermoplastic film, and the in some cases present third thermoplastic film are preferably designed as thermoplastic laminated films. They are preferably formed based on ethylene vinyl acetate (EVA), polyvinyl butyral (PVB), or polyurethane (PU) or mixtures or copolymers or derivatives thereof, particularly preferably based on polyvinyl butyral (PVB) and, in addition, additives known to a person skilled in the art, for example plasticizers. The thermoplastic laminated films preferably contain at least one plasticizer.

The thermoplastic intermediate layer may be formed only by the first thermoplastic film or also by more than one film. The thermoplastic intermediate layer can be formed by one or more thermoplastic films arranged one above the other, wherein the thickness of the thermoplastic intermediate layer after the lamination of the layer stack is preferably from 0.25 mm to 1 mm, typically 0.38 mm or 0.76 mm. The thermoplastic intermediate layer can also be formed from a film which is dyed or tinted in regions. The first thermoplastic film or plurality of thermoplastic films can also be functional thermoplastic films, in particular films with acoustically damping properties, a film reflecting infrared radiation, a film absorbing infrared radiation, and/or a film absorbing UV radiation. Thus, the first, in some cases the second and/or in some cases the third thermoplastic film can also be strip filter films, for example. If it is designed as a thermoplastic film, the darkened layer, too, can be part of the thermoplastic intermediate layer.

In a preferred embodiment, the darkened layer is designed as a polymeric film, preferably a thermoplastic film. The darkened layer is preferably formed based on ethylene vinyl acetate (EVA), polyethylene terephthalate (PET), polyvinyl butyral (PVB), or polyurethane (PU) or mixtures or copolymers or derivatives thereof, particularly preferably based on polyvinyl butyral (PVB) and, in addition, additives known to a person skilled in the art, for example plasticizers.

If something is formed "based on" a polymeric material, it consists predominantly, that is to say at least 50%, preferably at least 60%, and in particular at least 70%, of this material. It can thus also contain further materials such as, for example, stabilizers or plasticizers.

In a particularly preferred embodiment, the functional element is a PDLC (polymer dispersed liquid crystal) functional element. The PDLC functional element contains liquid crystals, which are embedded in a polymer matrix. If no voltage is applied to the PDLC functional element, the liquid crystals are aligned in an unordered manner, which results in strong scattering of the light passing through the active layer (translucency). If a voltage is applied to the functional element, the liquid crystals align in a common direction and the transmission of light through the functional element is increased (transparency). However, it may also be the case that the liquid crystals are present ordered in a voltage-free state and the liquid crystals are accordingly present unordered if a voltage is applied. However, other functional elements can also be used, the variability of whose optical properties is based on liquid crystals, for example PNLC (polymer-networked liquid crystal) functional elements. When the application of a voltage is mentioned in connection with the functional element as a PDLC functional element, this means an AC voltage (the RMS power-frequency value, not the instantaneous voltage) in the sense of the invention.

In a further preferred embodiment, the functional element is an SPD (suspended-particle device) functional element. In this case, the SPD functional element contains suspended particles. The suspended particles change the optical state of the functional element by absorbing light as a result of application of a voltage. SPD functional elements thus have switching states with transparent and opaque optical properties and intermediate stages between transparency and opacity. When the application of a voltage is mentioned in connection with the functional element as SPD functional element, this means an AC voltage (the RMS power-frequency value, not the instantaneous voltage) in the sense of the invention.

In a further, preferred embodiment, the functional element is an electrochromic functional element. In this case, the transmission of visible light through the functional element depends on the degree of embedding of ions. The ions are released, for example, by an ion storage layer and embedded in an electrochromic layer. The transmission can be influenced by the voltage which is applied to the functional element and causes a migration of the ions. Suitable electrochromic layers contain, for example, at least tungsten oxide or vanadium oxide. If the functional element is an electrochromic functional element, the control unit will preferably not be equipped with an inverter and a DC voltage is applied to the functional element. A DC-DC converter for reaching voltages in the range of 1 V to 50 V and preferably 10 V to 42 V can, however, be a component of the control unit depending on need.

In a particularly advantageous embodiment of the invention, the laminated pane comprises an emissivity-reducing coating. The emissivity-reducing coating is preferably applied to the interior-side surface of the inner pane.

The emissivity-reducing coating is a coating that reflects heat radiation. Such a coating is often also referred to as low-E coating or coating of low emissivity. It has the function of preventing the radiation of heat into the interior (thermal radiation of the pane itself) and also the emission of heat from the interior. In the sense of the invention, emissivity is understood to mean the normal emissivity at 283 K according to the standard EN 12898. Emissivity-reducing coatings which the laminated pane according to the invention can have are known to a person skilled in the art. These can, for example, be designed as disclosed in WO2018206236A1.

In a further particularly preferred embodiment of the invention, the laminated pane comprises an infrared protective layer, which is preferably arranged or applied on the interior-side surface of the outer pane, on the outer-side surface of the inner pane or between the outer pane and the inner pane. The infrared protective layer blocks infrared radiation and allows visible light to pass through. Within the meaning of the invention, "blocking of infrared radiation" means that the infrared protection layer at least partially reflects and/or absorbs infrared radiation. The infrared protection layer particularly preferably reflects infrared radiation. The reflection of the infrared radiation has the advantage that the laminated pane does not heat up so strongly. Infrared protective layers which the laminated pane can have are known to a person skilled in the art. These can be designed, for example, as disclosed in WO2019120850A1.

The outer pane and the inner pane are preferably produced from transparent glass, in particular soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes having a thickness in the range from 0.8 mm to 5 mm, preferably from 1.4 mm to 2.5 mm, are used, for example those with the standard thicknesses of 1.6 mm or 2.1 mm. Independently of each other, the outer pane and the inner panes can be not prestressed, partially prestressed or prestressed. If at least one of the panes should be prestressed, this can be thermal or chemical prestressing. The inner pane can have a recess in which the light source can be arranged. The inner pane particularly preferably consists of soda-lime glass having an iron oxide content of at most 1%. This low iron oxide content of the inner pane results in the inner pane being particularly clear and uncolored. The inner pane is thereby distinguished particularly well as an optical waveguide, i.e., for coupling in light.

The light of the light source is coupled into the inner pane, wherein the light source is arranged in a suitable manner relative to the pane for this purpose. The light source is preferably arranged laterally with respect to the inner pane, i.e., at its side edge, which allows for a good coupling of light into the pane. Likewise preferred is the arrangement of the light source in a recess or through-hole of the inner pane, which also allows for a good coupling of light into the inner pane. The light source is preferably fixedly connected to the inner pane by means of a housing. The light coupled into the inner pane is totally reflected in the pane until it is coupled out of the pane at the decoupling element. The light emitted from the light source is preferably visible light, i.e., light in a wavelength range of 380 nm to 780 nm. Alternatively, the light source can emit infrared or ultraviolet light which is preferably converted into visible light by fluorescent or luminescent particles, preferably as a constituent of the decoupling element.

The light source preferably contains a light-emitting diode (LED), preferably at least one organic light-emitting diode (OLED), at least one laser diode, at least one incandescent lamp, and/or at least one gas discharge lamp.

The decoupling element is provided to at least partially decouple the light coupled into the inner pane from the light source into the interior and/or the external environment. The decoupling element preferably decouples the light via the interior-side surface of the inner pane into an interior space, for example a vehicle interior. The decoupling element can be arranged within the see-through region of the laminated pane or outside the see-through region. In the context of the invention, "see-through region" means a region which is provided for seeing through the laminated pane. The see-through region does not have opaque layers, such as black printings, which prevent vision. The decoupling element is preferably suitable for decoupling at least a portion of the light conducted in the inner pane by scattering, reflection, refraction or diffraction.

In a preferred embodiment, the decoupling element is applied to the outer-side surface or the interior-side surface of the inner pane. For this purpose, the decoupling element is preferably introduced by laser structuring, mechanical structuring such as sandblasting, and/or by etching into the interior-side surface and/or the outer-side surface of the inner pane. Alternatively or in combination, the decoupling element can be integrally connected to the interior-side surface and/or the outer-side surface of the inner pane, preferably by printing or gluing of a colorant, a paste or particles, particularly preferably of light-scattering, light-refracting or light-reflecting particles. This shape of the decoupling element is preferred because it can also be implemented in a simple and uncomplicated manner after the inner pane has been produced.

Alternatively or in combination, the decoupling element can contain or consist of at least one transparent body which is integrally joined to the interior-side and/or the outer-side surface of the inner pane, for example by adhesive bonding, wherein the transparent body preferably contains or consists of
   a) a structured plastics film or plastics plate or
   b) a transmission-holographic film.

Advantageously, the structured plastics film or plastics plate has a planar arrangement of microprisms, such as a stepped prism.

In a further preferred embodiment of the invention, the decoupling element is arranged between the thermoplastic intermediate layer and the inner pane. In this case, the decoupling element is preferably a plastics film or plastics plate. In this way, the decoupling element is protected from external, harmful influences. The decoupling element can also be printed on the thermoplastic intermediate layer.

It is also possible for the decoupling element to be arranged within the inner pane. For this purpose, the decoupling element is preferably introduced during the production of the inner pane, particularly preferably by artificial generation of optical defects.

A further aspect of the invention comprises a method for producing a laminated pane with light source according to the invention. The method comprises the following method steps:
   (a) a layer stack made of the outer pane, the first thermoplastic film, the functional element, the darkened layer, the decoupling element, and the inner pane is produced. Preferably, the functional element, the darkened layer, and the first thermoplastic film are arranged between the outer pane and the inner pane.
   (b) the layer stack is laminated to form the laminated pane.
   (c) the light source is arranged on a side edge of the inner pane or in a recess of the inner pane.

Preferably, the light source is arranged such that the opaque region of the darkened layer extends at least over the region located between the light source and the functional element.

Lamination of the layer stack takes place under the action of heat, vacuum, and/or pressure, wherein the individual layers are bonded (laminated) by at least one thermoplastic film. Methods known per se for producing a laminated pane can be used. For example, so-called autoclave processes can be carried out at an elevated pressure of about 10 bar to 15 bar and temperatures of 130° C. to 145° C. over about 2 hours. Vacuum bag or vacuum ring methods known per se operate, for example, at approximately 200 mbar and 130° C. to 145° C. The layer stack may also be pressed in a calender between at least one pair of rollers to form a laminated pane. Systems of this type for the production of laminated glass panes are known and usually have at least one heating tunnel upstream of a pressing unit. The temperature during pressing is, for example, from 40° C. to 150° C. Combinations of calender and autoclave methods have proven particularly successful in practice. Vacuum laminators can be used as an alternative. They consist of one or more heatable and evacuable chambers in which the outer pane and the inner pane can be laminated within, for example, approximately 60 minutes at reduced pressures of 0.01 mbar to 800 mbar and temperatures of 80° C. to 170° C.

The laminated pane according to the invention can be, for example, the roof pane, windshield, side window, or rear window of a vehicle or another vehicle glass, for example a separating pane in a vehicle, preferably in a rail vehicle or a bus. Alternatively, the laminated glass pane can be an architectural glass, for example, in an outer façade of a building or a separating pane in the interior of a building, or a built-in part in furniture or devices.

A further aspect of the invention comprises the use of the laminated pane according to the invention in means of transportation on land, in the air, or on water, preferably in motor vehicles, for example as a windshield, rear pane, side pane, and/or glass roof, particularly preferably as a roof pane. Alternatively, the laminated pane can also be used as a functional and/or decorative individual piece and as a component in furniture, devices, and buildings.

Figure 1A:
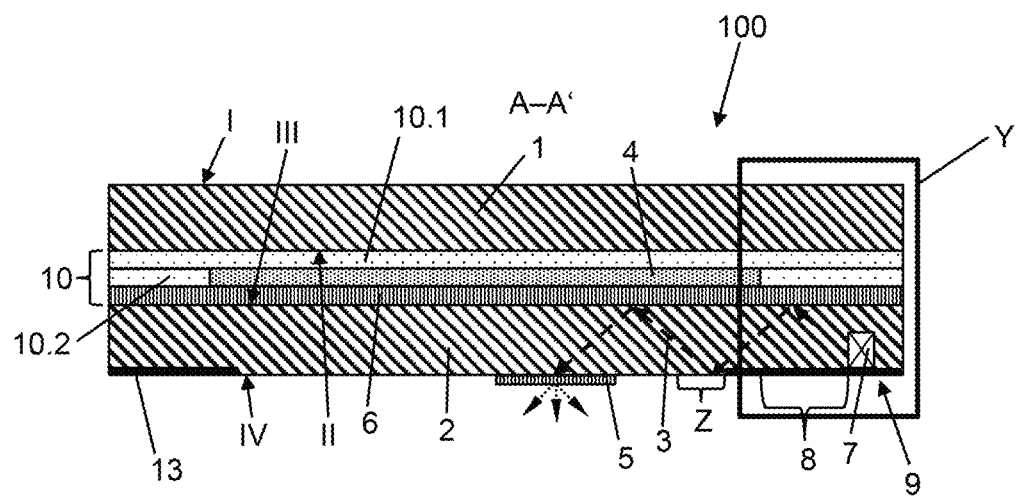
Figure 1B:
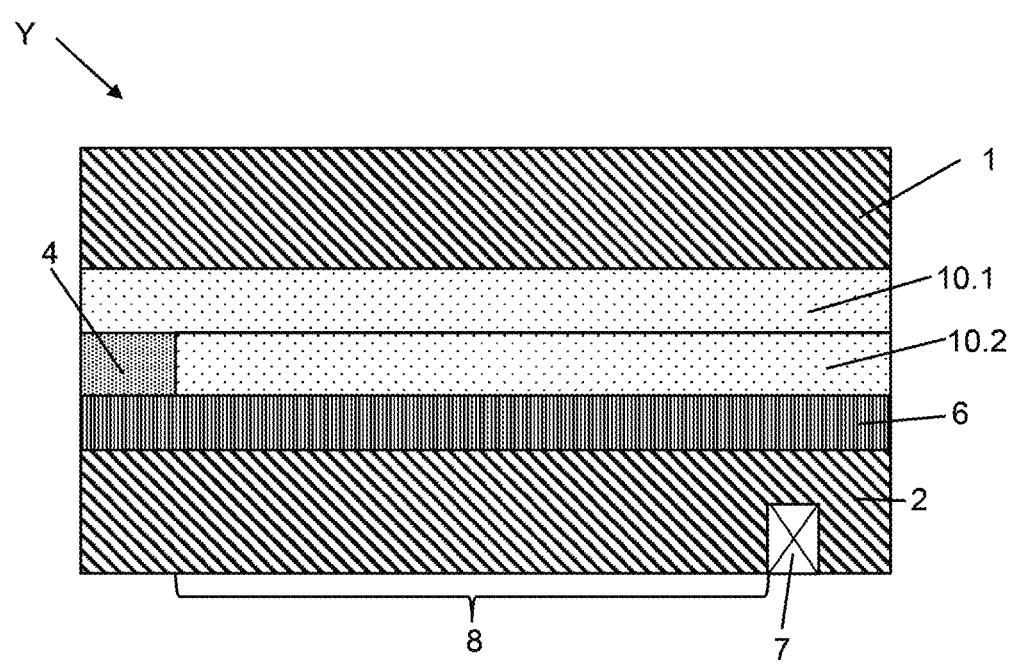
Figure 2:
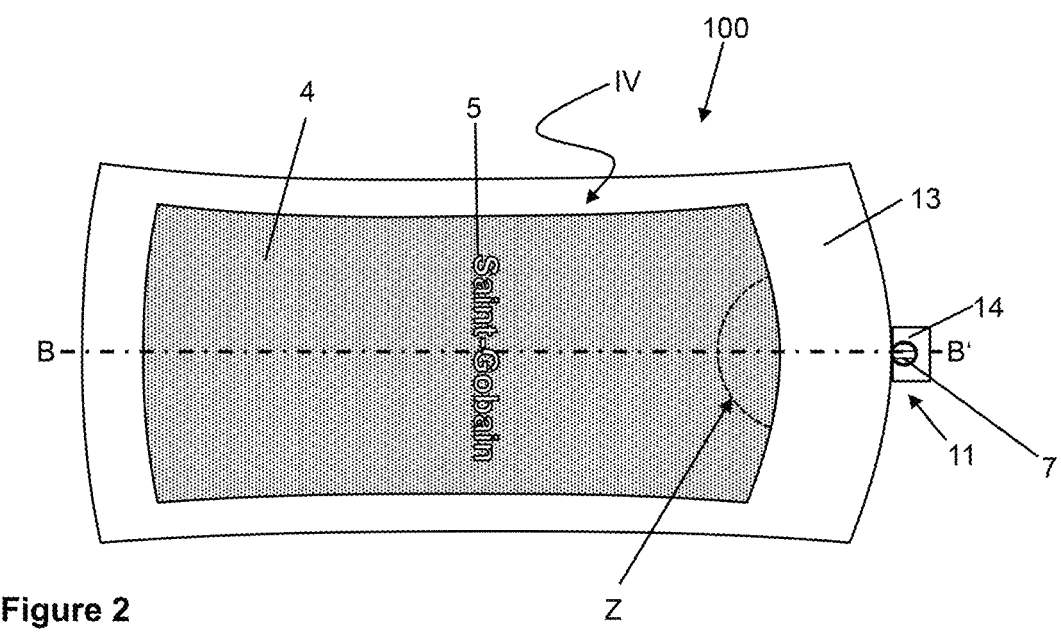

The invention is explained in more detail below with reference to exemplary embodiments, wherein reference is made to the accompanying figures. In a simplified, not-to-scale representation:

FIG. 1 is a plan view of an embodiment of the laminated pane according to the invention, FIG. 1a is a schematic cross-sectional view of the embodiment of the laminated pane according to the invention from FIG. 1, FIG. 1b is an enlarged detail of an edge region of the laminated pane from FIG. 1a, FIG. 2 is a plan view of further embodiments of the laminated pane according to the invention, and FIG. 3-6 show the further embodiments of the laminated pane according to the invention from FIG. 2 in a schematic cross-sectional representation.

FIG. 1 and FIG. 1a show different aspects of an embodiment of a laminated pane 100 according to the invention. FIG. 1 shows a plan view of the laminated pane 100 according to the invention, and FIG. 1a shows a cross-sectional view of the laminated pane 100 according to the invention. The cross-sectional view of FIG. 1a corresponds to intersection line A-A' of the laminated pane 100, as indicated in FIG. 1.

A light source 7 is arranged in a recess of the laminated pane 100. The laminated pane 100 is, for example, a roof pane of a vehicle, and the laminated pane 100 is installed in a roof of a vehicle. The laminated pane 100 comprises an outer pane 1 and an inner pane 2 which are connected to one another via an intermediate layer 10 arranged in a planar manner. The outer pane 1 has an outer-side surface I facing away from the intermediate layer 10 and an interior-side surface II facing the intermediate layer 10. The inner pane 2 has an interior-side surface IV facing away from the intermediate layer 10 and an outer-side surface III facing the intermediate layer 10. The interior-side surface IV of the inner pane 2 is at the same time the surface of the laminated pane 100 which faces the vehicle interior, and the outer-side surface I of the outer pane 1 is at the same time the surface of the laminated pane 100 which faces the external environment. The outer pane 1 consists, for example, of slightly color-tinted soda-lime glass with a thickness of 2.1 mm. The inner pane 2 consists, for example, of soda-lime glass with an iron oxide content of at most 1%. The inner pane 2 has, for example, a thickness of 1.6 mm. Due to its low iron oxide content, the inner pane 2 has a very low color tinting and is significantly more colorless than a soda-lime glass that is usually produced for the automobile sector. Due to its colorlessness, the inner pane 2 has good properties as a light guide.

Figure 4:
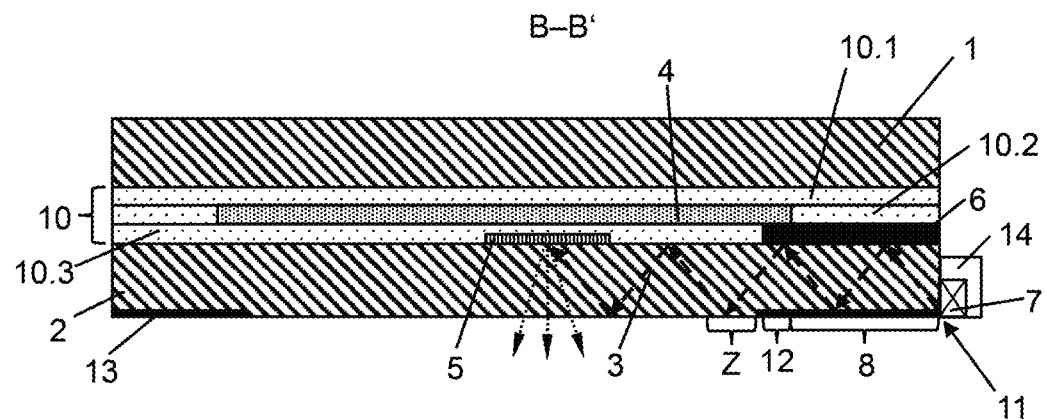
Figure 5:
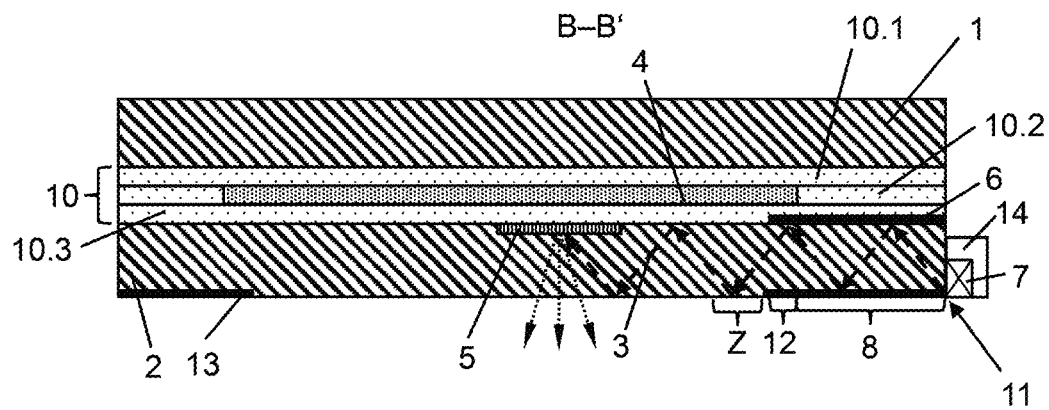

The intermediate layer comprises a first thermoplastic film 10.1, a second thermoplastic film 10.2, and a darkened layer 6. The first thermoplastic film 10.1 is arranged in a planar manner on the interior-side surface II of the outer pane 1, wherein the darkened layer 6 is arranged in a planar manner on the outer-side surface III of the inner pane 2. The darkened layer 6 extends, inter alia, over the entire region 8 of the laminated pane 100 located between the light source 7 and the functional element 4 and over an edge region 12 of the functional element 4 (the edge region 12 of the functional element 4 is shown in FIG. 4 and FIG. 5), which is closest to the light source 7. The second thermoplastic film 10.2 is arranged in a frame-like manner, similar to a picture framing mat, around a functional element 4, wherein the second thermoplastic film 10.2 and the functional element 4 are arranged between the first thermoplastic film 10.1 and the darkened layer 6. The second thermoplastic film 10.2 and the functional element 4 extend together as viewed over the entire surface of the laminated pane 100. The first and second thermoplastic film 10.1, 10.2 and the darkened layer 6 are made of the same thermoplastic material, for example PVB, so that after lamination to form the laminated pane 100 they fuse to one another to form the intermediate layer 10. The intermediate layer 10 has, for example, a thickness of 0.76 mm.

On the interior-side surface IV of the inner pane 2, an opaque black printing 13 is applied peripherally in a frame-like manner in the edge region of the inner pane 2. The black printing 13 runs along the peripheral edge of the inner pane 2 and prevents viewing through the laminated pane 100 in the region in which it is applied. By way of example, the black printing 13 does not have the same width in all regions, but it is also possible for the black printing 13 to have the same width everywhere. "Width" within the meaning of the invention means the extent perpendicular to the extension direction. The black printing 13 overlaps with a peripheral edge region of the functional element 4 in view through the laminated pane 100. The overlapped peripheral edge region of the functional element 4 has, for example, a width of 2 cm. The partial overlap of the functional element 4 with the black printing 13 has the purpose of covering the unaesthetic edge of the functional element for occupants of the vehicle. Optionally, a further black printing 13 can optionally also be applied in a peripheral edge region on the outer-side surface I or the interior-side surface II of the outer pane 1 (not shown here).

The functional element 4 is, for example, a PDLC functional element which is connected to a conducting element, for example a flat conductor, to a control unit located outside the laminated pane 100 (not shown here). The functional element 4 can switch its optical state via an applied AC voltage (RMS power-frequency value), which can be output by the control unit. The functional element 4 can switch, for example, by means of the applied voltage between two states, a translucent state (i.e., a state with high light scattering) and a transparent state. The translucent state is preferably achieved when the functional element 4 is voltage-free, i.e., no electrical voltage is applied. The transparent state is preferably achieved when an electrical voltage is applied to the functional element 4 by the control unit. Conditions between a maximum transparency of the functional element 4 and the maximum translucency of the functional element 4 are also possible.

A light source 7 is arranged in a recess 9 of the inner pane 2. The recess 7 is arranged in an edge region of the laminated pane 100 and is arranged in a plan view of the interior-side surface IV of the inner pane within the region on which the black printing 13 is applied. The light source 7 is, for example, an LED (light emitting diode) arrangement. The recess 9 of the inner pane 2 has, for example, a cylindrical shape and is only open on the interior-side surface IV of the inner pane 2. The opening of the recess 9 can optionally be covered (for example by a black colored and opaque film). When the light source 7 is activated, visible light 3 is coupled into the inner pane 2 via the inner surface of the recess 9. A total reflection of the coupled light 3 takes place within the inner pane 2. The light source 7 radiates the visible light 3 in the direction of a decoupling element 5, which is applied centrally on the interior-side surface IV of the inner pane 2. The total reflection of the visible light 3 in the inner pane 2 takes place until the visible light 3 strikes the decoupling element 5. In this case, the visible light 3 is coupled out of the inner pane 2 at this point and scattered outwardly, in particular in the direction of the vehicle interior.

Visible light patterns can be produced on the laminated pane 100 by the decoupling element 5. The decoupling element is, for example, a light-diffusing coating, for example in the form of a paste that was applied and fired in the screen printing method and was applied to the interior-side surface IV of the inner pane 2. The decoupling element forms, for example, the lettering "Saint-Gobain" as indicated in FIG. 1.

The light 3 coupled into the inner pane 2 from the light source 7 does not transmit 100% under total reflection up to the decoupling element 5. A small portion of visible light 3 already couples out before striking the decoupling element 5 and thus strikes the functional element 4, for example. The incidence of the visible light 3 on the functional element 4 results in a milky glimmer on the interior-side surface IV of the inner pane 2, which can be perceived by vehicle occupants in the vehicle interior as unpleasant or unaesthetic. This glimmer effect decreases with the distance from the light source 7 and is of various intensities depending on the optical state of the functional element 4. In a translucent state of the functional element 4, the glimmer effect is more pronounced than in a transparent state. It can be seen in particular in a portion Z of the functional element 4 that is visible from the vehicle interior and is located in spatial proximity to the light source 7. In the present embodiment according to the invention from FIG. 1, FIG. 1*a* and FIG. 1*b*, the problem is solved by the arrangement of a darkened layer 6 between functional element 4 and inner pane 2. The darkened layer 6 is, for example, tinted black and has a transmittance for visible light of 40%. Due to the tinting of the darkened layer 6 and the reduced light transmittance through the darkened layer 6, a large proportion of the diverted visible light 3 is absorbed by the darkened layer 6. The glimmer effect in the portion Z of the functional element 4 can thereby be greatly reduced or even completely avoided. This is a major advantage of the invention and was surprising for the inventors.

FIG. 1*b* shows an enlarged detail of an edge region Y of the laminated pane 100. The enlarged edge region Y of the laminated pane is indicated in FIG. 1*a*.

The variant shown in FIG. 2 to 6 corresponds substantially to the variant from FIG. 1, FIG. 1*a*, and FIG. 1*b*, so that only the differences will be discussed here, and reference is otherwise made to the description relating to FIG. 1, FIG. 1*a*, and FIG. 1*b*.

FIG. 2 shows a plan view of the laminated pane 100, wherein the light source 7 is not arranged in a recess 9, but rather by means of a housing 14 on a side edge 11 of the laminated pane 100. FIG. 3 to 6 show different embodiments of the invention in the cross-sectional view. The cross-sectional views of FIG. 3 to 6 correspond to the section line B-B' of the laminated pane 100, as indicated in FIG. 2. This means that the various embodiments of FIG. 3 to 6 are (schematically) optically identical in plan view of the laminated pane 100.

Figure 3:
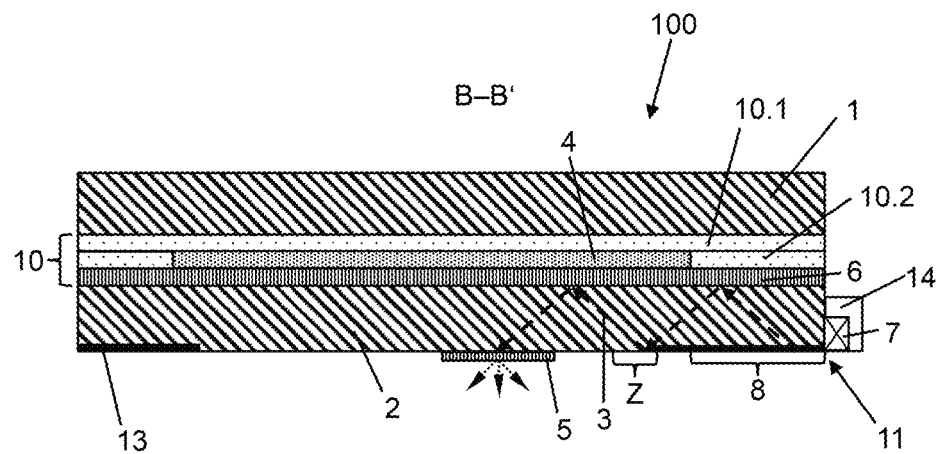

In contrast to FIG. 1, FIG. 1a and FIG. 1b, the laminated pane 100 from FIG. 3 does not have a recess 9 of the inner pane 2, and the light source 7 is attached to a side edge 11 of the inner pane 2 via a housing 14. The light source 7 thus couples the visible light 3 emitted thereby into the inner pane 2 via a lateral edge of the inner pane 2.

In contrast to FIG. 1, FIG. 1a and FIG. 1b, the laminated pane 100 from FIG. 4 does not have a recess 9 of the inner pane 2, and the light source 7 is attached to a side edge 11 of the inner pane 2 via a housing 14. The light source 7 thus couples the visible light 3 emitted thereby into the inner pane 2 via a lateral edge of the inner pane 2. The darkened layer 6 also extends only in regions, for example 20%, over the area of laminated pane 100. A third transparent thermoplastic film 10.3 is arranged next to the darkened layer 6 and is located in the same plane as the darkened layer 6, i.e., does not overlap it when viewing through the laminated pane 100. The darkened layer 6 and the transparent third thermoplastic film 10.3 extend together as viewed over the entire surface of the laminated pane 100. The thermoplastic intermediate layer 10 is thus composed of the first, the second, and the third thermoplastic film and the darkened layer 6.

Unlike in FIGS. 1 and 1a, the decoupling element 5 is not applied on the interior-side surface IV of the inner pane 2, but on the surface of the third thermoplastic film 10.3 facing the inner pane 2.

The darkened layer 6 extends over the entire region 8 of the laminated pane 100 located between the light source 7 and the functional element 4 and over an edge region 12 of the functional element 4, which is closest to the light source 7. In a plan view of the interior-side surface IV of the inner pane 2, the darkened layer 6 is completely covered by the black printing. The darkened layer 6 has a light transmittance for visible light of less than 1% and is colored black. Due to the low transmittance of the darkened layer, a large part of the coupled-in light 3, which is not transmitted to the decoupling element 5 under total reflection in the inner pane 2, is absorbed by the darkened layer 6, so that the glimmer effect in the vehicle interior portion Z of the functional element 4 can be reduced or avoided.

Unlike in FIGS. 1 and 1a, the decoupling element 5 is not applied to the interior-side surface IV of the inner pane 2 in FIG. 5, but rather on the outer-side surface III of the inner pane 2. The light source 7 is attached in a manner identical to FIG. 3 by means of a housing 14 on a side edge 11 of the inner pane 2. The darkened layer 6 is applied in the form of an opaque black printing on the outer-side surface III of the inner pane 2 and extends over the entire region 8 of the laminated pane 100 located between the light source 7 and the functional element 4 and over the edge region 12 of the functional element 4, which is closest to the light source 7. In addition to the first and the second thermoplastic film 10.1, 10.2, the intermediate layer 10 also comprises a third transparent thermoplastic film 10.3, which is arranged between the functional element 4 and the inner pane 2 and extends over the entire surface of the laminated pane 100.

Figure 6:
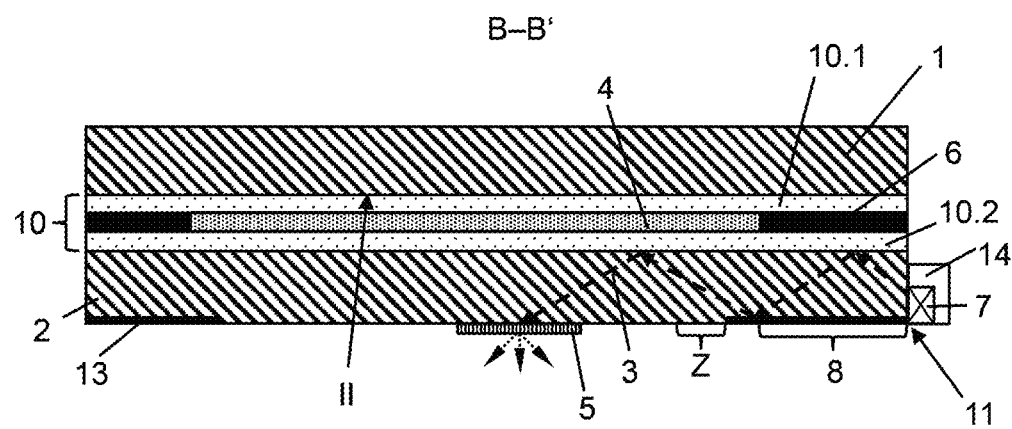

In FIG. 6, the darkened layer 6 is arranged in a frame-like manner around the functional element 4 and has a light transmittance of less than 1%. The intermediate layer 10 comprises the first thermoplastic film 10.1, the darkened layer 6, and a third thermoplastic film 10.3, wherein the third thermoplastic film is arranged between the functional element 4 and the inner pane 2. The light source 7 is attached in a manner identical to FIG. 3 by means of a housing 14 on a side edge 11 of the inner pane 2.

The darkened layer 6 formed in a frame-like manner reduces the incidence of visible light 3 on the interior-side surface II of the outer pane 1. In the generic laminated pane 100, a portion of the visible light 3 is reflected from the interior-side surface II of the outer pane 1. This reflected light 3 strikes the functional element 4, which in turn can lead to the glimmer effect already described in the portion Z of the functional element 4. This reflection at the interior-side surface II of the outer pane 1 can be reduced by the layer 6 formed in a frame-like manner.

LIST OF REFERENCE SIGNS

1 Outer pane
2 Inner pane
3 Light
4 Functional element
5 Decoupling element
6 Darkened layer
7 Light source
8 Region between the light source 7 and the functional element 4
9 Recess of the inner pane 2
10 Intermediate layer
10.1 First thermoplastic film
10.2 Second thermoplastic film
10.3 Third thermoplastic film
11 Side edge of the inner pane 2
12 Edge region of the functional element 4, which is closest to the light source 7
13 Black printing
14 Housing of the light source 7
100 Laminated pane
I Outer-side surface of the outer pane 1
II Interior-side surface of the outer pane 1
III Outer-side surface of the inner pane 2
IV Interior-side surface of the inner pane 2
Z Portion of the glimmer effect
Y Enlarged portion of an edge region of the laminated pane 100
A-A' Cross section through the laminated pane 100 from FIG. 1
B-B' Cross section through the laminated pane 100 from FIG. 2

The invention claimed is:

1. A laminated pane with light source, comprising:
an outer pane and an inner pane,
a first thermoplastic film arranged between the outer pane and the inner pane,
a functional element with electrically controllable optical properties,
a darkened layer,
a decoupling element for decoupling light from the inner pane, and
a light source arranged on a peripheral side edge of the inner pane or in a recess of the inner pane for coupling light into the inner pane,
wherein the darkened layer has at least one opaque region having a light transmittance of less than or equal to 50% and the opaque region is present at least within a region between the light source and the functional element.

2. The laminated pane according to claim 1, wherein at least one edge region of the functional element, which is closest to the light source, coincides with the opaque region of the darkened layer.

3. The laminated pane according to claim 2, wherein a second thermoplastic film partially or completely surrounds the functional element.

4. The laminated pane according to claim 1, wherein at least the opaque region of the darkened layer has a light transmittance of <10%.

5. The laminated pane according to claim 1, wherein the darkened layer is designed as a thermoplastic film having the opaque region and a transparent region, wherein the transparent region of the darkened layer has a light transmittance of ≥50%.

6. The laminated pane according to claim 1, wherein the entire darkened layer has a light transmittance of <10%.

7. The laminated pane according to claim 6, wherein the darkened layer extends over less than 40% of the area of the laminated pane.

8. The laminated pane according to claim 6, wherein the darkened layer is applied to an outer-side surface of the inner pane facing the outer pane.

9. The laminated pane according to claim 8, wherein the darkened layer is formed as a screen printing.

10. The laminated pane according to claim 2, wherein the darkened layer is a tinted or colored thermoplastic film and has a light transmittance of at least 15% and at most 50%.

11. The laminated pane according to claim 10, wherein the darkened layer extends over the entire surface of the laminated pane.

12. The laminated pane according to claim 1, wherein the functional element is a PDLC functional element.

13. The laminated pane according to claim 1, wherein an emissivity-reducing coating is applied to an interior-side surface of the inner pane facing away from the outer pane.

14. A method for producing a laminated pane with light source according to claim 1, comprising:

(a) providing a layer stack consisting of the outer pane, the first thermoplastic film, the functional element, the darkened layer, the decoupling element and the inner pane,
(b) laminating the layer stack to form the laminated pane, and
(c) arranging the light source on a side edge of the inner pane or in a recess of the inner pane.

15. A method comprising providing a laminated pane according to claim 1 in means of transportation for traffic on land, in the air, or in water or as a functional and/or decorative individual piece and as a built-in part in furniture, devices, and buildings.

16. The laminated pane according to claim 4, wherein at least the opaque region of the darkened layer has a light transmittance of <1%.

17. The laminated pane according to claim 6, wherein the entire darkened layer has a light transmittance of <1%.

18. The laminated pane according to claim 7, wherein the darkened layer extends over less than 20% of the area of the laminated pane.

19. The laminated pane according to claim 9, wherein the darkened layer is formed as a black screen printing.

20. The method according to claim 15, wherein the laminated pane is a windshield, a rear window, a side window, or a glass roof of a vehicle.

21. The laminated pane according to claim 1, wherein the darkened layer is arranged between the outer pane and the inner pane.

* * * * *